(No Model.)
J. W. ATKINSON.
LEVEL.
No. 312,548. Patented Feb. 17, 1885.
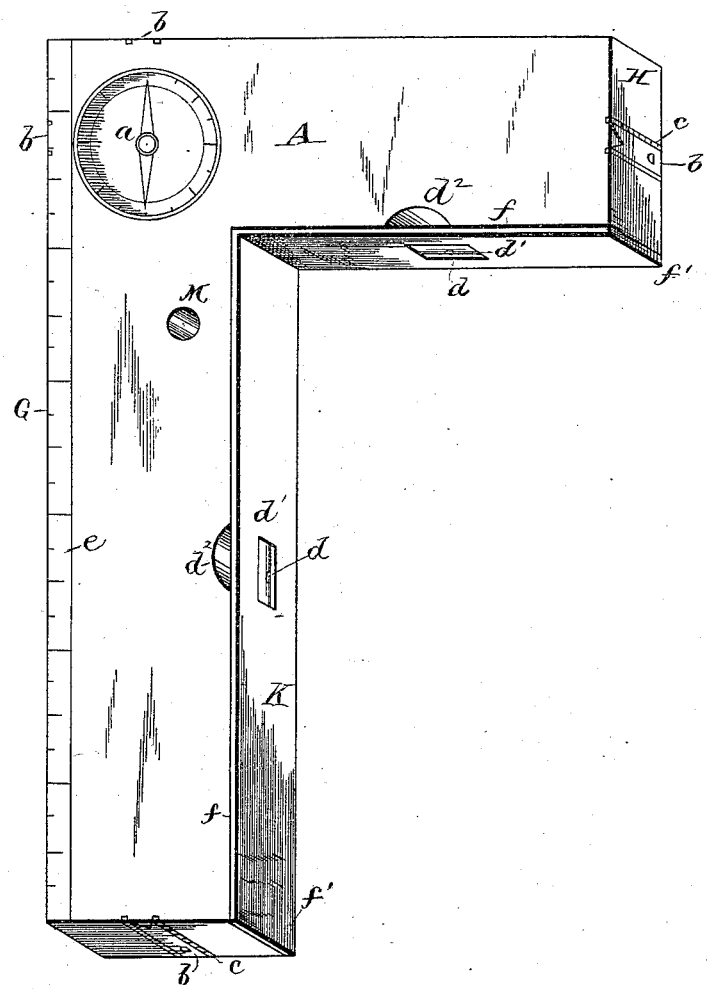
Witnesses:
Wm A. Rosenbaum
John Welch
Inventor.
John W. Atkinson
by J. S. Duffie
Atty.

UNITED STATES PATENT OFFICE.

JOHN W. ATKINSON, OF BENTON, ARKANSAS.

LEVEL.

SPECIFICATION forming part of Letters Patent No. 312,548, dated February 17, 1885.

Application filed June 5, 1884. (No model.)

*To all whom it may concern:*

Be it known that I, JOHN W. ATKINSON, a citizen of the United States, residing at Benton, in the county of Saline and State of Arkansas, have invented certain new and useful Improvements in Levels; and I do declare the following to be a full, clear, and exact description of the invention, such as will enable others skilled in the art to which it appertains to make and use the same, reference being had to the accompanying drawing, and to the letters and figures of reference marked thereon, which form a part of this specification.

The nature of my invention consists, first, in combining with the level a plummet, a carpenter's square, a rule, and a north and south compass; second, in a great improvement upon the old levels as now in common use; third, the combining with said level an improved and novel method of plumbing, the whole being so constructed as to give at once the proper form for a carpenter's square and rule, as shown in the accompanying drawing.

The figure is a perspective view of my invention.

In the accompanying drawing, A is the body of the instrument. $a$ is a north and south compass, marked with all the degrees, for the purpose of squaring at greater distances and with more accuracy than can conveniently be done with measuring-lines, and for the further purpose of properly facing a building toward any point of the compass.

$b\ b\ b\ b$ are graduated sliding sights working up and down in slides $c$, for the purpose of being used in connection with the compass in taking bearings in squaring and leveling.

$d\ d$ are spirit-levels, which may be seen through openings $d'$ on the edges of the instrument and openings $d^2$ on the side of the instrument. On the reverse side of the level are openings corresponding with openings $d^2$, so that the spirit-level can be seen from either face of the instrument.

$e$ is a metal plate divided into inches and parts of inches, to be used as a measuring-rule, its upper face being on a level with the face of the instrument.

The inner edges, $f\ f$, of the instrument are faced with a heavy plate of metal, $f'\ f'$, to give greater strength to the instrument. When resting on the side G, with the end H uppermost, it is to be used as an ordinary level by the use of the spirit-level on the longer surface K. The opening M is for placing the instrument upon a pedestal when required, and is made at the center of gravity of the instrument.

Brass will be used in constructing the instrument, as there is less attraction of the needle from brass than other metals.

Having described my invention, what I claim as new, and desire to secure by Letters Patent, is—

1. A leveling and surveying instrument having an L-shaped body, A, with openings M and $d^2$, plate K, and measuring-rule G, north and south compass $a$, set in the face of said body A, graduated sliding sights $b\ b$, working up and down in slides $c$, and spirit-levels $d\ d$, substantially as shown and described.

2. A leveling and surveying instrument having the L-shaped body A, north and south compass $a$, set in the face of said body A, graduated sliding sights $b$, working up and down in slides $c$, spirit-levels $d\ d$, and face-plates $f'$, substantially as shown and described.

In testimony whereof I affix my signature in presence of two witnesses.

JOHN W. ATKINSON.

Witnesses:
DANIEL S. WRIGHT,
A. D. JONES.